(12) United States Patent
Bailey et al.

(10) Patent No.: US 7,673,235 B2
(45) Date of Patent: Mar. 2, 2010

(54) METHOD AND APPARATUS FOR UTILIZING AN OBJECT MODEL TO MANAGE DOCUMENT PARTS FOR USE IN AN ELECTRONIC DOCUMENT

(75) Inventors: Eric D. Bailey, Redmond, WA (US); Roberto C. Taboada, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 11/072,188

(22) Filed: Mar. 4, 2005

(65) Prior Publication Data

US 2006/0080603 A1  Apr. 13, 2006

Related U.S. Application Data

(63) Continuation-in-part of application No. 10/955,622, filed on Sep. 30, 2004, now Pat. No. 7,617,450.

(51) Int. Cl.
*G06F 17/00* (2006.01)
(52) U.S. Cl. ............... 715/255; 715/256; 715/253; 715/243
(58) Field of Classification Search ............ 715/501.1, 715/513, 500, 530, 531, 517, 255, 256, 200, 715/243, 253
See application file for complete search history.

(56) References Cited

U.S. PATENT DOCUMENTS

| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin et al. |
| 5,222,205 A | 6/1993 | Larson et al. |
| 5,267,155 A | 11/1993 | Buchanan et al. |
| 5,469,533 A | 11/1995 | Dennis |
| 5,487,138 A | 1/1996 | Rust et al. |
| 5,537,526 A | 7/1996 | Anderson et al. |
| 5,579,466 A * | 11/1996 | Habib et al. ............ 715/210 |
| 5,579,519 A | 11/1996 | Pelletier |
| 5,613,124 A | 3/1997 | Atkinson et al. |
| 5,655,130 A | 8/1997 | Dodge et al. |

(Continued)

FOREIGN PATENT DOCUMENTS

EP       1 376 387 A2    1/2004

(Continued)

OTHER PUBLICATIONS

ReplyAssitant, copyright 2001, pp. 1-34.*

(Continued)

*Primary Examiner*—Thu Huynh
(74) *Attorney, Agent, or Firm*—Merchant & Gould P.C.

(57) ABSTRACT

A method and apparatus are provided for utilizing a document object model to manage document parts for use in an electronic document. The document object model enables a user to retrieve, insert, add, and delete document parts to and from an electronic document using a programmable interface from within a word processing application program. A document part programming interface is exposed in the object model and methods associated with the object model are called which return objects enabling the location and management of document parts in a document parts collection.

19 Claims, 4 Drawing Sheets

U.S. PATENT DOCUMENTS

| | | | |
|---|---|---|---|
| 5,675,788 A | 10/1997 | Husick et al. | |
| 5,701,342 A | 12/1997 | Anderson et al. | |
| 5,745,910 A | 4/1998 | Piersol et al. | |
| 5,752,055 A | 5/1998 | Redpath et al. | |
| 5,752,056 A | 5/1998 | Celik | |
| 5,819,295 A | 10/1998 | Nakagawa et al. | |
| 5,845,058 A | 12/1998 | Shaw et al. | |
| 5,893,109 A | 4/1999 | DeRose et al. | |
| 5,903,903 A | 5/1999 | Kennedy | |
| 5,903,905 A * | 5/1999 | Andersen et al. | 715/526 |
| 5,905,504 A | 5/1999 | Barkans et al. | |
| 5,911,776 A | 6/1999 | Guck | |
| 5,950,215 A | 9/1999 | Tabuchi | |
| 5,960,168 A | 9/1999 | Shaw et al. | |
| 5,993,088 A | 11/1999 | Nogay et al. | |
| 6,023,714 A | 2/2000 | Hill et al. | |
| 6,026,416 A | 2/2000 | Kanerva et al. | |
| 6,067,531 A | 5/2000 | Hoyt et al. | |
| 6,094,665 A | 7/2000 | Lyons et al. | |
| 6,134,552 A | 10/2000 | Fritz et al. | |
| 6,144,974 A | 11/2000 | Gartland | |
| 6,175,845 B1 | 1/2001 | Smith et al. | |
| 6,182,080 B1 | 1/2001 | Clements | |
| 6,182,096 B1 | 1/2001 | Mastie et al. | |
| 6,199,082 B1 | 3/2001 | Ferrel et al. | |
| 6,212,530 B1 | 4/2001 | Kadlec | |
| 6,247,018 B1 | 6/2001 | Rheaume | |
| 6,247,066 B1 | 6/2001 | Tanaka | |
| 6,269,403 B1 | 7/2001 | Anders et al. | |
| 6,342,904 B1 | 1/2002 | Vasudevan et al. | |
| 6,362,870 B2 | 3/2002 | Mui et al. | |
| 6,393,441 B1 * | 5/2002 | Kanerva et al. | 715/514 |
| 6,407,821 B1 | 6/2002 | Hohensee et al. | |
| 6,418,448 B1 | 7/2002 | Sarkar | |
| 6,449,653 B2 | 9/2002 | Klemets et al. | |
| 6,457,017 B2 | 9/2002 | Watkins et al. | |
| 6,480,206 B2 | 11/2002 | Prinzing | |
| 6,484,189 B1 | 11/2002 | Gerlach et al. | |
| 6,496,206 B1 | 12/2002 | Mernyk et al. | |
| 6,507,858 B1 | 1/2003 | Kanerva et al. | |
| 6,509,974 B1 * | 1/2003 | Hansen | 358/1.12 |
| 6,538,760 B1 | 3/2003 | deBry et al. | |
| 6,549,918 B1 | 4/2003 | Probert, Jr. et al. | |
| 6,583,789 B1 | 6/2003 | Carlson et al. | |
| 6,591,278 B1 | 7/2003 | Ernst | |
| 6,604,144 B1 | 8/2003 | Anders | |
| 6,608,693 B1 | 8/2003 | Loyd et al. | |
| 6,609,200 B2 | 8/2003 | Anderson et al. | |
| 6,654,737 B1 | 11/2003 | Nunez | |
| 6,657,647 B1 | 12/2003 | Bright | |
| 6,658,477 B1 | 12/2003 | Lisitsa et al. | |
| 6,674,540 B1 | 1/2004 | Wiechers et al. | |
| 6,675,353 B1 | 1/2004 | Friedman | |
| 6,675,356 B1 | 1/2004 | Adler et al. | |
| 6,681,223 B1 | 1/2004 | Sundaresan | |
| 6,694,485 B1 | 2/2004 | Kelley et al. | |
| 6,715,126 B1 | 3/2004 | Chang et al. | |
| 6,763,343 B1 | 7/2004 | Brooke et al. | |
| 6,771,291 B1 | 8/2004 | DiStefano, III | |
| 6,781,609 B1 | 8/2004 | Barker et al. | |
| 6,785,673 B1 | 8/2004 | Fernandez | |
| 6,789,229 B1 | 9/2004 | Dunietz et al. | |
| 6,812,941 B1 | 11/2004 | Brown et al. | |
| 6,871,321 B2 | 3/2005 | Wakayama | |
| 6,910,843 B2 | 6/2005 | Saw et al. | |
| 6,912,555 B2 | 6/2005 | Lemon et al. | |
| 6,918,082 B1 | 7/2005 | Gross et al. | |
| 6,925,597 B2 | 8/2005 | Anwar | |
| 6,925,631 B2 | 8/2005 | Golden | |
| 6,931,590 B2 | 8/2005 | Kanie et al. | |
| 6,938,203 B1 | 8/2005 | Dimarco et al. | |
| 6,941,510 B1 | 9/2005 | Ozzie et al. | |
| 6,952,801 B2 | 10/2005 | Warmus et al. | |
| 6,961,902 B2 | 11/2005 | Anecki et al. | |
| 6,981,207 B1 | 12/2005 | Bakman et al. | |
| 6,993,527 B1 | 1/2006 | Raman et al. | |
| 7,036,076 B2 | 4/2006 | Anwar | |
| 7,051,276 B1 | 5/2006 | Mogilevsky et al. | |
| 7,054,841 B1 | 5/2006 | Tenorio | |
| 7,080,083 B2 | 7/2006 | Kim et al. | |
| 7,134,071 B2 | 11/2006 | Ohwada et al. | |
| 7,168,035 B1 | 1/2007 | Bell et al. | |
| 7,171,618 B2 | 1/2007 | Harrington et al. | |
| 7,290,205 B2 | 10/2007 | Monocsko et al. | |
| 7,301,544 B2 | 11/2007 | Yuan | |
| 7,412,649 B2 | 8/2008 | Emek et al. | |
| 7,418,652 B2 | 8/2008 | Ornstein et al. | |
| 7,487,448 B2 | 2/2009 | Emerson et al. | |
| 7,549,118 B2 | 6/2009 | Shur et al. | |
| 2001/0003828 A1 | 6/2001 | Peterson et al. | |
| 2001/0013043 A1 | 8/2001 | Wagner | |
| 2001/0016842 A1 | 8/2001 | Umen et al. | |
| 2001/0018697 A1 | 8/2001 | Kunitake et al. | |
| 2001/0034739 A1 | 10/2001 | Anecki et al. | |
| 2001/0039552 A1 * | 11/2001 | Killi et al. | 707/500 |
| 2001/0044809 A1 | 11/2001 | Parasnis et al. | |
| 2001/0044813 A1 | 11/2001 | Frank | |
| 2001/0051962 A1 | 12/2001 | Plotkin | |
| 2001/0054042 A1 | 12/2001 | Watkins et al. | |
| 2002/0004805 A1 | 1/2002 | Nojima et al. | |
| 2002/0016800 A1 | 2/2002 | Spivak et al. | |
| 2002/0038348 A1 | 3/2002 | Malone et al. | |
| 2002/0049790 A1 | 4/2002 | Ricker et al. | |
| 2002/0059265 A1 | 5/2002 | Valorose | |
| 2002/0059337 A1 * | 5/2002 | Takaoka et al. | 707/500 |
| 2002/0065848 A1 | 5/2002 | Walker et al. | |
| 2002/0065857 A1 | 5/2002 | Michalewicz | |
| 2002/1005933 A1 * | 5/2002 | Takaoka et al. | 707/500 |
| 2002/0073236 A1 | 6/2002 | Helgeson et al. | |
| 2002/0087602 A1 | 7/2002 | Masuda et al. | |
| 2002/0099797 A1 | 7/2002 | Merrell et al. | |
| 2002/0103835 A1 | 8/2002 | Kearney | |
| 2002/0107886 A1 | 8/2002 | Gentner et al. | |
| 2002/0111133 A1 | 8/2002 | Wittkotter | |
| 2002/0116416 A1 | 8/2002 | Tesch et al. | |
| 2002/0116421 A1 | 8/2002 | Fox et al. | |
| 2002/0120647 A1 | 8/2002 | Amano | |
| 2002/0129058 A1 | 9/2002 | Story et al. | |
| 2002/0174145 A1 | 11/2002 | Duga et al. | |
| 2002/0184263 A1 | 12/2002 | Perinet et al. | |
| 2002/0188638 A1 | 12/2002 | Hamscher | |
| 2002/0194220 A1 | 12/2002 | Sluiman | |
| 2003/0004957 A1 | 1/2003 | Broman et al. | |
| 2003/0023637 A1 | 1/2003 | Halahmi | |
| 2003/0028560 A1 | 2/2003 | Kudrolli et al. | |
| 2003/0033287 A1 | 2/2003 | Shanahan et al. | |
| 2003/0046317 A1 | 3/2003 | Cseri et al. | |
| 2003/0065946 A1 | 4/2003 | Holliday et al. | |
| 2003/0074633 A1 | 4/2003 | Boulmakoul et al. | |
| 2003/0079181 A1 | 4/2003 | Schumacher et al. | |
| 2003/0093520 A1 | 5/2003 | Beesley | |
| 2003/0115547 A1 | 6/2003 | Ohwada et al. | |
| 2003/0120671 A1 | 6/2003 | Kim et al. | |
| 2003/0126136 A1 | 7/2003 | Omoigui | |
| 2003/0126260 A1 | 7/2003 | Husain et al. | |
| 2003/0137539 A1 | 7/2003 | Dees | |
| 2003/0137691 A1 | 7/2003 | Tanaka | 358/1.15 |
| 2003/0142128 A1 | 7/2003 | Reulein et al. | |
| 2003/0145134 A1 | 7/2003 | Wehage et al. | |
| 2003/0149934 A1 | 8/2003 | Worden | 715/513 |
| 2003/0149935 A1 | 8/2003 | Takizawa et al. | 715/513 |
| 2003/0158851 A1 | 8/2003 | Britton et al. | |
| 2003/0163552 A1 | 8/2003 | Savitzky et al. | |
| 2003/0167446 A1 | 9/2003 | Thomas | 715/513 |

| | | |
|---|---|---|
| 2003/0172168 A1 | 9/2003 | Mak et al. |
| 2003/0172343 A1 | 9/2003 | Leymaster et al. |
| 2003/0177446 A1 | 9/2003 | Gropper et al. |
| 2003/0177449 A1 | 9/2003 | Rose ................... 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. |
| 2003/0221167 A1 | 11/2003 | Goldstein et al. ........... 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0002937 A1 | 1/2004 | Jones et al. ................. 707/1 |
| 2004/0003343 A1 | 1/2004 | Liao et al. |
| 2004/0003388 A1 | 1/2004 | Jacquemot et al. |
| 2004/0003389 A1 | 1/2004 | Reynar et al. ............... 717/178 |
| 2004/0015782 A1 | 1/2004 | Day et al. |
| 2004/0015890 A1 | 1/2004 | Wong et al. |
| 2004/0015908 A1 | 1/2004 | Giel et al. |
| 2004/0019853 A1 | 1/2004 | Takizawa et al. |
| 2004/0030711 A1 | 2/2004 | Roudot |
| 2004/0030987 A1 | 2/2004 | Manelli |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054967 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1 | 5/2004 | Lee et al. |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1* | 7/2004 | Hudson ................ 715/530 |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1 | 9/2004 | Jones et al. |
| 2004/0172592 A1 | 9/2004 | Collie et al. |
| 2004/0181753 A1 | 9/2004 | Michaelides |
| 2004/0183837 A1 | 9/2004 | Watanabe et al. |
| 2004/0194025 A1 | 9/2004 | Hubert et al. |
| 2004/0205470 A1 | 10/2004 | Jones et al. ................. 715/500 |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. |
| 2004/0210818 A1 | 10/2004 | Jones et al. ................. 715/500 |
| 2004/0216048 A1 | 10/2004 | Brown et al. |
| 2004/0221233 A1 | 11/2004 | Thielen |
| 2004/0225957 A1 | 11/2004 | Egilsson |
| 2004/0226012 A1 | 11/2004 | Awada et al. ............... 718/100 |
| 2004/0230894 A1 | 11/2004 | Elza et al. |
| 2004/0243551 A1 | 12/2004 | Boone et al. ................. 707/3 |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts ................ 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ........... 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0149861 A1 | 7/2005 | Bishop et al. ................ 715/515 |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0025091 A1 | 2/2006 | Buford ................... 455/154.2 |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0069983 A1 | 3/2006 | Bailey et al. ............. 715/501.1 |
| 2006/0075337 A1* | 4/2006 | Jones et al. ................. 715/530 |
| 2006/0080314 A1 | 4/2006 | Hubert et al. |
| 2006/0080316 A1 | 4/2006 | Gilmore et al. |
| 2006/0080603 A1 | 4/2006 | Bailey et al. |
| 2006/0095834 A1 | 5/2006 | Jeon et al. |
| 2006/0117019 A1 | 6/2006 | Sylthe et al. |
| 2006/0136433 A1 | 6/2006 | Rothschiller et al. ........ 707/100 |
| 2006/0136477 A1 | 6/2006 | Bishop et al. ................ 707/102 |
| 2006/0136553 A1 | 6/2006 | Villaron et al. ............. 709/203 |
| 2006/0136809 A1 | 6/2006 | Fernstrom |
| 2006/0136812 A1 | 6/2006 | Jones et al. ................. 715/511 |
| 2006/0136816 A1 | 6/2006 | Jones et al. ................. 715/517 |
| 2006/0136827 A1 | 6/2006 | Villaron et al. ............. 715/730 |
| 2006/0155529 A1 | 7/2006 | Ludviksson et al. |
| 2006/0168562 A1 | 7/2006 | Emek et al. |
| 2006/0190815 A1 | 8/2006 | Jones et al. ................. 715/515 |
| 2006/0206794 A1 | 9/2006 | Ornstein et al. |
| 2006/0227150 A1 | 10/2006 | Yuan |
| 2006/0259854 A1 | 11/2006 | Walker et al. ............. 715/501.1 |
| 2006/0271574 A1 | 11/2006 | Villaron et al. ............. 707/100 |
| 2006/0277452 A1 | 12/2006 | Villaron et al. ............. 715/500 |
| 2007/0022128 A1 | 1/2007 | Rothschiller et al. ........ 707/100 |
| 2007/0061384 A1 | 3/2007 | Harrington et al. |
| 2007/0136443 A1 | 6/2007 | Sah et al. |
| 2007/0136662 A1 | 6/2007 | Khaba |

FOREIGN PATENT DOCUMENTS

| | | |
|---|---|---|
| EP | 1 452 966 A2 | 11/2004 |
| EP | 1 672 543 | 11/2005 |
| EP | 1 672 528 | 12/2005 |
| JP | 2003288334 | 10/2003 |
| KR | 20030048630 | 6/2003 |
| RU | 2202825 C2 | 4/2003 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |

| | | |
|---|---|---|
| WO | WO 2006/133053 | 12/2006 |
| ZA | 2005/09350 | 4/2008 |

OTHER PUBLICATIONS

Microsoft Word, (hereinafter Word), copyright 2001, pp. 1-4.*
Office Action Correspondence Subsystem, version 1.3 (herein after OACS), copyright Feb. 2003, pp. 1-2 to 1-123, 2-2 to 2-122 and 3-2 to 3-44).*
Frank M. Carrano, "Data Abstraction and Problem Solving with C++", copyright 1995, pp. 14-16.*
Brauer M. et al., "Open Office Specification 1.0," Online Publication, Mar. 22, 2004, XP002404030; Retrieved from the Internet: URL:http://www.oasis-open.org/committees/download.php/6037/office-spec-1.0-cd-1.pdf on Oct. 20, 2006, 607 pp.
Anonymous: "Technical note TN2073: Deconstructing A Keynote 1.x Document: Part One—Slides," Online Publication, May 20, 2003, XP002404031, Retrieved from the Internet: URL:http:////developer.apple.com/technotes/tn2002/pdf/tn2073.pdf on Oct. 20, 2006, 27 pp.
Anonymous: "Technical Note 2067: About the Keynote XML File Format (APXL Schema)," Online Publication, Feb. 12, 2003, XP002404032; Retrieved from the Internet: URL:http://developer.apple.com/technotes/tn2002/pdf/tn2067.pdf on Oct. 20, 2006, 26 pp.
Anonymous: "Mulberry Slideshow XML (v 2.1): A User's Guide," Online Publication, Dec. 7, 2001, XP002404033; Retrieved from the Internet: URL:http://www.mulberrytech.com/slideshow/Mulberry-slideshow.zip on Oct. 20, 2006, 17 pp.
U.S. Appl. No. 10/726,077, filed Dec. 2003, Jones et al.
U.S. Appl. No. 10/731,900, filed Dec. 2003, Jones et al.
"@try inCSS3 (was: Useragent Rules in CSS)", http://lists.w3.org/Archives/Public/www-style/2004Mar/0333.html, 2 pages (Mar. 31, 2004).
"Apache Server Frequently Asked Questions", Apache HTTP Server Version 1.3, http://httpd.apache.org/docs/1.3/misc/FAQ.html; 43 pages.
"Controlling the Data Chaos by Adding Intelligence to Media", 4 pages (2004).
"Networked File System", http://www.scit.wlv.ac.uk/~jphb/comms/nfs.htm; 7 pages.
"Open eBook Publication Structure 1.2", http://www.idpf.org/oebps/oebps1.2/download/oeb12-xhtml.htm, 71 pages (Aug. 27, 2002).
Bleuthman et al., "Interleaved Graphics and Text", IBM Technical Disclosure Bulletin, vol. 22, No. 11, pp. 4813-4815 (Apr. 1980).
Chien et al., "Efficient Schemes for Managing Multiversion XML Documents", The VLDB Journal, vol. 11, pp. 332-353 (2002).
Christodoulakis et al., "Multimedia Document Presentation, Information, Extraction, and Document Formation in MINOS: A Model and a System", ACM Transactions on Office Information Systems, vol. 4, No. 4, pp. 345-383 (Oct. 1986).
El-Kwae et al., "Document Image Representation Using XML Technologies", in Document Recognition and Retrieval IX, Kantor et al., Proceedings of SPIE, vol. 4670, pp. 109-120 (2002).
Ellis, "Postscrip, Bezier Curves and Chinese Characters", ACM, Seventeenth Annual ACM Computer Science Conference, pp. 162-165 (Feb. 1989).
Girardot et al., "Efficient Representation and Streaming of XML Content Over the Internet Medium", ICME2000, IEEE, pp. 67-70 (2000).
Han et al., "WebSplitter: A Unified XML Framework for Multi-Device Collaborative Web Browsing", ACM, pp. 221-230 (2000).
Hardy et al., "Mapping and Displaying Structural Transformations Between XML and PDF", ACM 2002, pp. 95-102 (2002).
Holman, "What is XSL-FO", Google Mar. 20, 2002, http://www.xml.com/pub/a/2002/03/20/xsl-fo.html, 18 pages.
Jacobs et al., "Adaptive Grid-Based Document Layout", ACM Transactions on Graphics, vol. 22, No. 2, pp. 838-847 (Jul. 2003).
Marco et al., "A Framework for Designing and Implementing the Ada Standard Container Library", ACM, pp. 49-61 (2003).
Meyer, O. "aTool—Creating Validated XML Documents on the Fly Using MS Word", pp. 113-121 (Oct. 2002).
Miller, "An Introduction to the Resource Description Framework", D-Lib Magazine, ISSN 1082-9873, http://www.dlib.org/dlib/may98/miller/05miller.html, 10 pages (May 1998).
Obasanjo, "Designing Extensible, Versionable XML Formats", Google Jul. 21, 2004, http://www.xml.com/pub/a/2004/07/21/design.html, 17 pages.
Obasanjo, "Designing XML Formats: Versioning vs. Extensibility", Google 2004, blogs.msdn.com/dareobasanjo/archive/2004/04/11/111369.aspx. One additional page is included to show the actual date of the article which is Nov. 17, 2004, 24 pages.
Obasanjo, Designing XML Formats: Versioning vs. Extensibility, Google Apr. 11, 2004, blogs.msdn.com/dareobasanjo/archive/2004/04/11/111369.aspx, 3 pages.
OpenOffice.org, "OpenOffice.org User Guide for Version 1.1.x: Chapter 4: Spreadsheets in Calc", published May 7, 2004, pp. 1, 2, 179-254, http://documentation.openoffice.org/manuals/OOo1.x.x/user_guide.pdf.
OpenOffice.org, "OpenOffice.org User Guide for Version 1.1.x: Chapter 5: Creating Presentations With Impress", published May 7, 2004, pp. 1, 2, 255-286, http://documentation.openoffice.org/manuals/OOo1.x.x/user_guide.pdf.
Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003), 12 pages.
Pawson, "Printing from XML: An Introduction to XSL-FO,", Google Oct. 9, 2002, http://www.xml.com/pub/a/2002/10/09/xslfo.html, 6 pages.
Peters et al., "CrystalWeb-A Distributed Authoring Environment for the World-Wide Web," Computer Networks and ISDN Systems, vol. 27, No. 6, pp. 861-870 (Apr. 1995).
Sahuguet et al., "Building Intelligent Web Applications Using Lightweight Wrappers", Data and Knowledge Engineering, vol. 36, pp. 283-316 (2001).
StarOffice 7 Office Suite, A Sun ONE Software Offering, Basic Programmer's Guide, pp. 1-10, 47, 91, 104 (Jul. 2003).
Halvorson et al., "Microsoft Office XP Inside Out, 2001", Microsoft Press, pp. 272, 273 and 289.
"Introduction to SpreadsheetML", Online Helpfile 'OFFICEXMLSDK.CHM' extracted from 'OFFICE2003XMLSCHEMA.EXE', Dec. 5, 2003 http://www.microsoft.com/downloads/details.aspx?familyid=fe118952-3547-420a-a412-00a2662442d9&displaying=en, retrieved on Apr. 10, 2008, 58 pp.
"Comparative Assessment of Open Documents Formats Market Overview—Valoris", 2003, http://europa.eu/int/idabc/en/document/3439, retrieved on Apr. 10, 2008, 40 pp.
"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.
Orchard et al. "[Editorial Draft] Versioning XML Languages W3C Proposed TAG Finding", http://www.w3.org/2001/tag/doc/versioning-20031116, Nov. 16, 2003, pp. 1-23.
Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.
Jones, B., "Word XML's Context Free Chunks: Building a Document from Multiple Pieces of Content", http://blogs.msdn.com/brian_jones_archive/2005/07/20/441167.aspx, Jul. 20, 2005, pp. 1-4.
Adobe Creative Team, "Adobe Acrobat 5.0 Classroom in a Book", published Jun. 26, 2001, Adobe Press, pp. 1-26+cover page (27 pp.).
U.S. Official Action mailed Jan. 23, 2009 in U.S. Appl. No. 11/389,367, pp. 1-28.
PCT Search Report dated Jul. 3, 2007 in PCT/US2006/21825, pp. 1-9.
European Communication dated Mar. 26, 2008 in EP 05112123.4, pp. 1-6.
Chinese Office Action dated Aug. 1, 2008 in 200510125062.6, pp. 1-21.

Chinese First Office Action dated Feb. 6, 2009 in 200510088462.4, pp. 1-21.
Chinese Second Office Action dated Mar. 6, 2009 in 200510126798.5, pp. 1-17.
European Search Report dated Mar. 11, 2009 in EP 05111550.9, pp. 1-7.
European Communication dated Mar. 12, 2009 in EP 05111375.1. pp. 1-4.
Chinese Second Office Action dated Mar. 13, 2009 in 200480001395.1, pp. 1-7.
Chinese Second Office Action dated Mar. 27, 2009 in 20040001339.08, pp. 1-7.
Chinese Decision on Rejection dated Mar. 27, 2009 in 200480001336.4, pp. 1-17.
Chinese Decision on Rejection dated May 8, 2009 in 200510125059.04, pp. 1-14.
Chinese Third Office Action dated Jun. 5, 2009 in 200510126789.6, pp. 1-7.
Russian Official Action dated Jan. 13, 2008 in 2412-139543RU/8132, pp. 1-9.
Proydakov, E.M., "English-Russian Explanatory Dictionary in Computing Engineering, Internet, and Programming", Moscow: publishing house "Russian edition", 2001, pp. 1-3.
Gudgin, M., "SOAP Version 1.2 Part 1: Messaging Framework", W3C Candidate Recommendation (Dec. 19, 2002), pp. 1-65.
Chinese Second Office Action dated Jun. 5, 2009 in 200480001312.9, pp. 1-9.
Chinese Third Office Action dated Jul. 17, 2009 in 200480001395.01, pp. 1-7.
European Communication Date Jul. 10, 2009 in EP 05111511.1-1527, pp. 1-5.
Fontaine, J., "moodss (Modular Object Oriented Dynamic Spreadsheet)", http://web.archive.org/web/20050311052520l/http://jfontain.free.fr/moodss.htm, published Mar. 11, 2005, 42 pp plus 1 wayback page (total 43 pp).
U.S. Official Action mailed Jul. 30, 2009 in U.S. Appl. No. 11/389,367, pp. 1-42.
U.S. Official Action mailed Aug. 4, 2009 in U.S. Appl. No. 11/072,659, pp. 1-33.
U.S. Official Action mailed Aug. 5, 2009 in U.S. Appl. No. 11/445,903, pp. 1-29.
U.S. Official Action mailed Aug. 6, 2009 in U.S. Appl. No. 11/431,931, pp. 1-54.
U.S. Official Action mailed Sep. 16, 2009 in U.S. Appl. No. 11/072,659, pp. 1-17.
Mexican Official Action dated Jun. 9, 2009 in PA/a/2005/012556, pp. 1-3.
Mexican Official Action dated Jun. 9, 2009 in PA/a/2005/012553, pp. 1-6.
Steele, "Easy Microsoft Office Word 2003", published Sep. 19, 2003, Que Corporation, pp. 52, 53 and 216 (6 total pages).
Unknown, ReplyAssistant Version 1.1, downloaded from <http://www.goldmedalsoft.com/shareware/Business_Finance-Miscellaneous-ReplyAssistant-1.1.html>, Copyright 2000-2001, 7 figures, 5 pages ReadMet, 1 page About ReplyAssistant, 15 pages.
van Leeuwen et al., "XML for Flexibility and Extensibility of Design Information Models", Proceedings of CAADRIA, University of Sydney, Australia, pp. 491-502 (2001).
Whitmer, R., "Document Object Model (DOM) Level 3 Xpath Specification", W3C, http://www.w3.org/TR/DOM-Level-3-XPath/, Feb. 26, 2004, Version 1.0, 18 pages.
U.S. Official Action mailed May 12, 2006 in U.S. Appl. No. 10/731,900.
U.S. Official Action mailed Feb. 28, 2007 in U.S. Appl. No. 10/731,900.
U.S. Official Action mailed Aug. 9, 2007 in U.S. Appl. No. 10/731,900.
U.S. Official Action mailed Sep. 20, 2005 in U.S. Appl. No. 10/836,326.
U.S. Official Action mailed May 31, 2006 in U.S. Appl. No. 10/836,326.
U.S. Official Action mailed Oct. 20, 2006 in U.S. Appl. No. 10/836,326.
U.S. Official Action mailed Apr. 9, 2007 in U.S. Appl. No. 10/836,326.
U.S. Official Action mailed Jul. 26, 2007 in U.S. Appl. No. 10/836,326.
U.S. Official Action mailed Feb. 22, 2008 in U.S. Appl. No. 10/836,327.
U.S. Official Action mailed Jun. 28, 2006 in U.S. Appl. No. 10/836,608.
U.S. Official Action mailed Dec. 12, 2006 in U.S. Appl. No. 10/836,608.
U.S. Official Action mailed Mar. 8, 2007 in U.S. Appl. No. 10/836,608.
U.S. Official Action mailed Jul. 27, 2007 in U.S. Appl. No. 10/836,608.
U.S. Official Action mailed Jan. 24, 2005 in U.S. Appl. No. 10/837,040.
U.S. Official Action mailed Jul. 15, 2005 in U.S. Appl. No. 10/837,040.
U.S. Official Action mailed Oct. 18, 2005 in U.S. Appl. No. 10/837,040.
U.S. Official Action mailed Apr. 6, 2006 in U.S. Appl. No. 10/837,040.
U.S. Official Action mailed Sep. 29, 2006 in U.S. Appl. No. 10/837,040.
U.S. Official Action mailed Dec. 19, 2006 in U.S. Appl. No. 10/837,040.
U.S. Official Action mailed May 15, 2007 in U.S. Appl. No. 10/837,040.
U.S. Official Action mailed Jun. 14, 2007 in U.S. Appl. No. 10/955,622.
U.S. Official Action mailed Mar. 17, 2008 in U.S. Appl. No. 10/955,622.
U.S. Official Action mailed Aug. 2, 2007 in U.S. Appl. No. 11/018,405.
U.S. Official Action mailed Feb. 21, 2007 in U.S. Appl. No. 11/018,569.
U.S. Official Action mailed Jul. 26, 2007 in U.S. Appl. No. 11/018,569.
U.S. Official Action mailed Mar. 18, 2008 in U.S. Appl. No. 11/018,569.
U.S. Official Action mailed Jun. 19, 2007 in U.S. Appl. No. 11/018,718.
U.S. Official Action mailed Mar. 21, 2007 in U.S. Appl. No. 11/018,910.
U.S. Official Action mailed Oct. 3, 2007 in U.S. Appl. No. 11/018,910.
U.S. Official Action mailed Mar. 7, 2007 in U.S. Appl. No. 11/018,912.
U.S. Official Action mailed Oct. 1, 2007 in U.S. Appl. No. 11/018,912.
U.S. Official Action mailed Mar. 21, 2007 in U.S. Appl. No. 11/019,088.
U.S. Official Action mailed Sep. 17, 2007 in U.S. Appl. No. 11/072,659.
U.S. Official Action mailed Feb. 4, 2008 in U.S. Appl. No. 11/125,907.
U.S. Official Action mailed Aug. 29, 2006 in U.S. Appl. No. 11/222,344.
U.S. Official Action mailed Feb. 22, 2007 in U.S. Appl. No. 11/222,344.
U.S. Official Action mailed Aug. 1, 2007 in U.S. Appl. No. 11/222,344.
U.S. Official Action mailed Oct. 3, 2006 in U.S. Appl. No. 11/222,442.
U.S. Official Action mailed Feb. 20, 2007 in U.S. Appl. No. 11/222,442.
U.S. Official Action mailed Jul. 10, 2007 in U.S. Appl. No. 11/222,442.
U.S. Official Action mailed Jun. 18, 2007 in U.S. Appl. No. 11/398,339.
U.S. Official Action mailed Mar. 25, 2008 in U.S. Appl. No. 11/398,339.
European Search Report dated Nov. 3, 2006 in EP 05111509.5.

European Search Report dated Dec. 19, 2007 in EP 05111677.0.
European Search Report dated Dec. 19, 2007 in EP 05111375.1.
European Search Report dated Dec. 19, 2007 in EP 05112123.4.

European Examination Report dated Mar. 3, 2008 in EP 05111375.1.

* cited by examiner

METHOD AND APPARATUS FOR UTILIZING AN OBJECT MODEL TO MANAGE DOCUMENT PARTS FOR USE IN AN ELECTRONIC DOCUMENT

CROSS-REFERENCE TO RELATED APPLICATIONS

This patent application is a continuation-in-part application of U.S. patent application Ser. No. 10/955,622 filed Sep. 30, 2004, now U.S. Pat. No. 7,617,450 entitled "Method, System, And Computer-Readable Medium For Creating, Inserting, And Reusing Complex Document Parts In An Electronic Document," the disclosure of which is expressly incorporated herein, in its entirety, by reference.

BACKGROUND OF THE INVENTION

Modern word processors enable a user to readily create electronic documents. Many modern word processors include templates to facilitate the insertion of "document parts" which are typical structural elements found in a variety of documents. These typical structural elements include such features as cover pages, headers and footers, and the like. A user of a word processing application program typically selects a desired document part from a template of similarly styled parts created by a template author and then inserts the selected document part in the document. Unfortunately, the creation and insertion of document parts in modern word processors presents a number of drawbacks to both the template author as well as the end user.

One drawback associated with the creation of document part templates for use in modern word processors is that the template author generally must undergo the time consuming task of creating each document part from scratch utilizing various graphical software tools to design and format each document part. One drawback associated with the insertion of document parts in a document by an end user is that the end user must depend on template authors to design suitable document parts for insertion (i.e., the typical end user lacks the design skill require to design or modify existing document parts). Another drawback associated with the insertion of document parts by an end user is that the end user must typically perform a series of steps so that the document part will fit the size and layout of the document in which it is inserted. For instance, to insert a cover page a user may perform one or more of the following time-consuming steps: 1. Insert a page break at the top of the document; 2. Center the test vertically in the page by using empty paragraph markers so that the title is displayed correctly; 3. Increase the font size of the title; 4. Add empty space to push text to the bottom of the page where the author's name and date will be displayed; 5. Right align the text and make it smaller.

It is with respect to these considerations and others that the various embodiments of the present invention have been made.

BRIEF SUMMARY OF THE INVENTION

In accordance with the present invention, the above and other problems are solved by a method and apparatus for utilizing a document object model to manage document parts for use in an electronic document. The document object model enables a user to retrieve, insert, add, and delete document parts to and from an electronic document using a programmable interface from within a word processing application program.

According to one aspect of the invention, a method is provided for utilizing an object model in a word processing application program for managing document parts for use in an electronic document. The method includes exposing a document part programming interface in the object model and calling a plurality of methods associated with the object model, wherein the called plurality of methods return objects enabling the location and management of document parts in a document parts collection. One of the called methods returns an object identifying a collection of categories in the document parts collection and adds a new category of document parts to the collection of categories. The new document part may be added based on a specified text range in the electronic document. Another called method returns an object identifying a specified category in the document parts collection and deletes one or more document parts contained within the specified category.

Another called method returns an object identifying one or more document parts in the document parts collection and add a new document part to the document parts collection. Another called method returns an object identifying a specified document part and deletes the specified document part from the document parts collection. Another called method returns an object identifying a specified document part and inserts the specified document part in the electronic document. The specified document part may be inserted in place of a specified range in the electronic document. Once the specified document part is inserted, an event is triggered notifying a calling application that the document part has been inserted in the electronic document. The object model may further include an InsertOptions property for setting insertion options for a document part in the electronic document.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
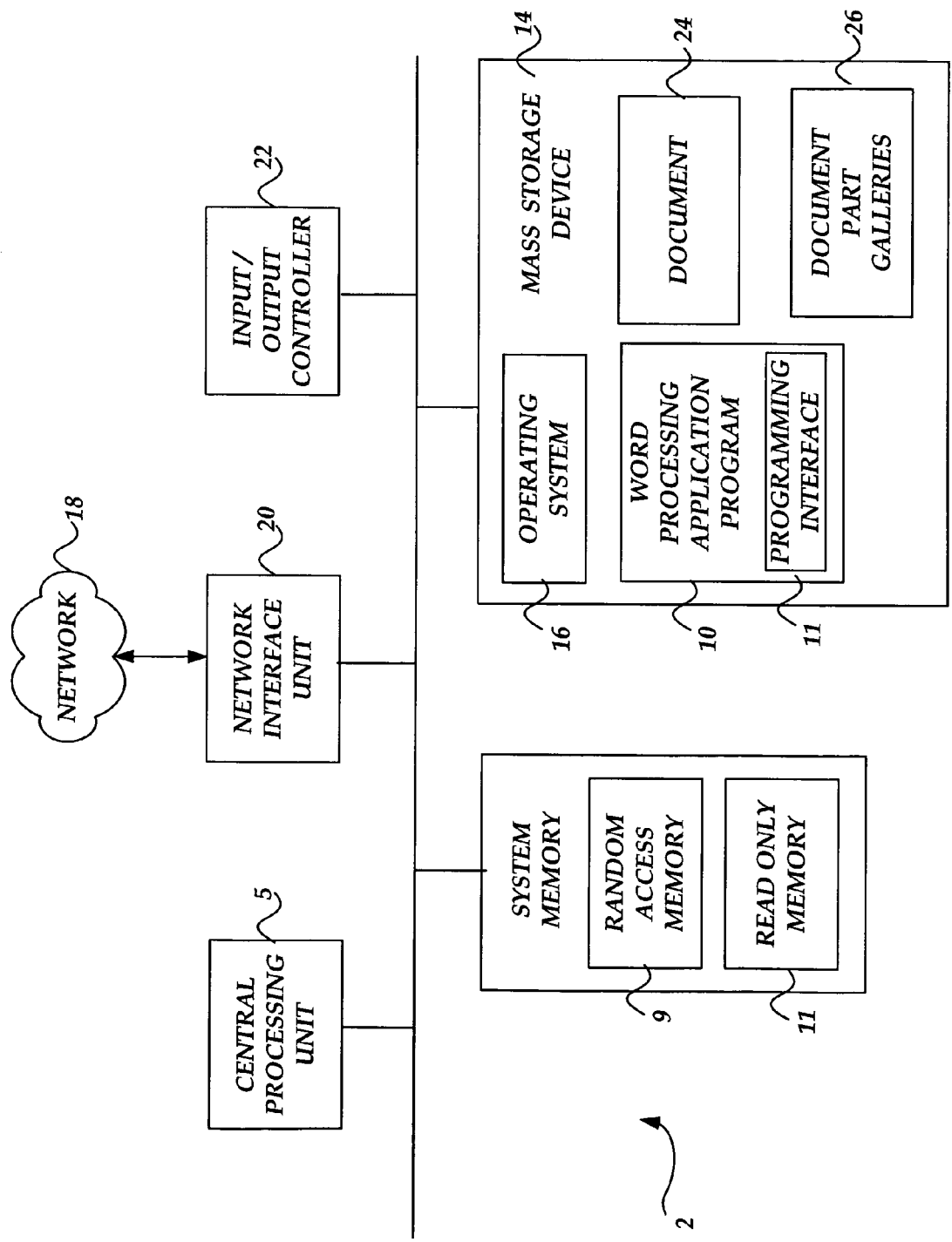
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 10. As known to those skilled in the art, the word processing application program 10 is operative to provide functionality for creating and editing electronic documents, such as document 24.

In conjunction with the editing of a word processing document, the word processing application program 10 provides functionality for allowing a user to create, insert, and reuse "document parts" into various locations in the document 24. As defined herein, document parts are preformatted structural elements or layouts which add structure to documents including, but not limited to, the following types and categories: cover pages, mathematical equations, indexes and tables (e.g., Table of Contents, Table of Figures, and Table of Authorities), page headers and footers, pages and sections (e.g., blank pages and two-column pages), personal contact information (e.g., name and address information), images, textboxes, AutoText, and watermarks. The document parts utilized by the word processing application program 10 may be stored as categories in document part galleries 26 which may be stored in the mass storage device 14. It will be appreciated that in addition to the categories discussed above, various embodiments of the invention may also include a "general document parts" gallery including user created document parts as well as user modified document parts representing document parts from a combination of other galleries.

It will be appreciated that the document parts discussed with respect to the various embodiments of the invention may be designed by a professional template designer or created by an end user within the word processing application program 10. It will further be appreciated that each of the document part galleries 26 may have actions associated with them for modifying, inserting, formatting, and removing document parts from a document.

The word processing application program 10 also includes a programming interface 11 which provides an object model interface for providing all of the functionality of the word processor's user interface, via code. As is known to those skilled in the art, object models are used in software applications to provide a way for code to automate tasks that a user may perform through a user interface of an application, such as the word processing application program 10. The object model allows code to be written which, for example, automates repetitive tasks for the user and reacts to (e.g., validates, etc.) actions by the user. The programming interface 11 provides structures which provide code access to equivalents of all of the paradigms/user interfaces of the word processing application program 10. These structures are organized into four basic categories:

Objects: Structures which correspond to actionable objects within an application—for example, a document part is an object in the object model corresponding to a document part from the document part galleries 26 which may be inserted into an electronic document.

Methods: Actions that can be performed on an object (e.g., insert, add, or delete).

Properties: Things that can be set about an object (e.g., a description of a document part).

Events: Actions in response a user's (or code's) interaction with an application (e.g., in response to inserting a document part, an event notifies the word processing application program that the document part was inserted in the document).

It will be appreciated that any object within an object model can include methods, properties, and/or events which allow code to manipulate that object. According to one embodiment of the invention, the word processing application program 10 comprises the WORD word processing application program from MICROSOFT CORPORATION. It should be appreciated, however, that word processing application programs from other manufacturers may be utilized to embody the various aspects of the present invention. It should further be appreciated that the various aspects of the present invention are not limited to word processing application programs but may also utilize other application programs which are capable of processing text.

Figure 2A:
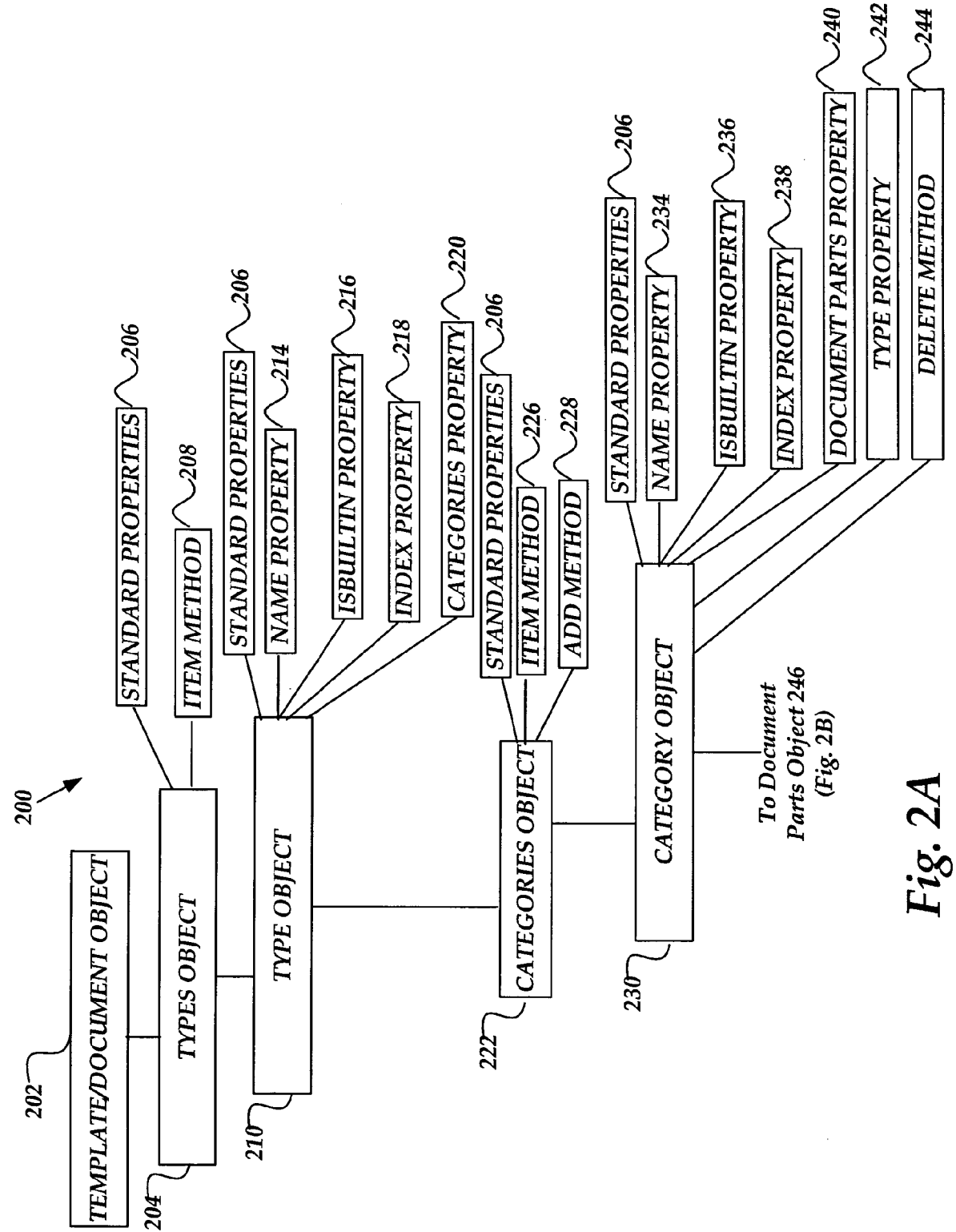
FIGS. 2A-2B is a diagram of an object model hierarchy showing the objects, properties, methods, and events which may be utilized in the object model to manage document parts for use in an electronic document, according to the various embodiments of the invention.
Figure 2B:
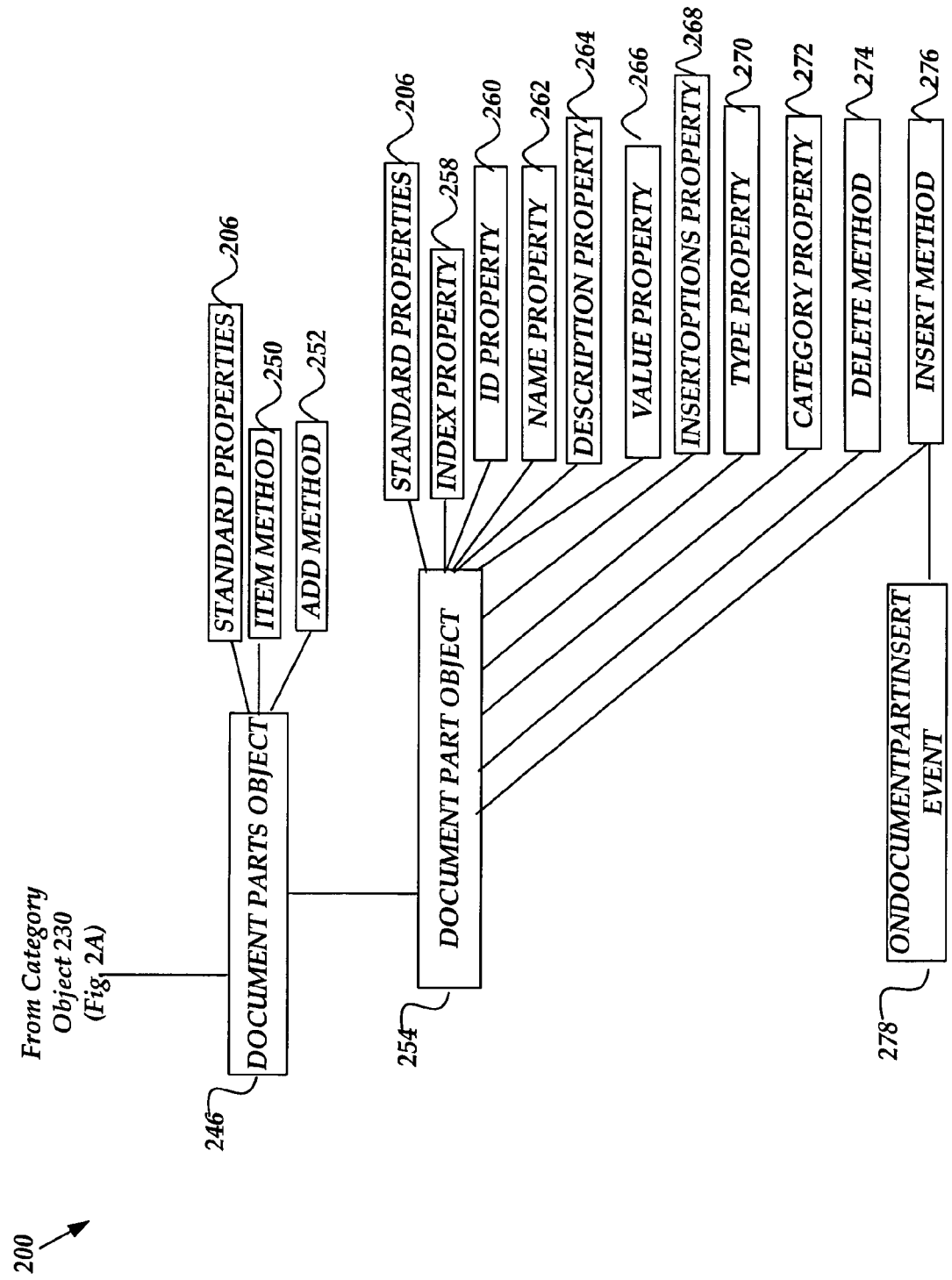

Referring now to FIGS. 2A and 2B, an object hierarchy or tree 200 will be described illustrating objects, method, properties, and events which may be manipulated by the programming interface 11 to provide access to document part functionality in the word processing application program 10. The tree 200 initially includes a Template/Document object 202. The Template object tree may be independent from the Document object tree with each tree comprising a hierarchy of child objects including document part types, document part categories, and individual document parts. Child objects under the Template object allow users to programmatically manage document part stores. Child objects under Document object allow users to track and manipulate document parts inserted into an electronic document.

The child object under the Template/Document object 202 is Types object 204. The Types object 204 is associated with a gallery or collection of the various types of document parts which may be inserted in a document such as, for example, Issues, Cover Pages, Headers/Footers, and Watermarks. The Types object 204 contains properties and methods including, but not limited to, standard properties 206 such as an Application property, Count property, Creator property, and Parent property. It will be appreciated by those skilled in the art that the standard properties 206 are commonly used properties included in the object model associated with word processing application programs such as the WORD word processing application program. The Types object 204 also includes an Item method 208 which returns an individual Type object in the collection of document part types. In particular, the Item method 208 returns an individual document type object such as a Cover Page object from the document part types collection. The Item method 208 may correspond to the following syntax: expression.Item(Index) where expression is an expression that returns a Types object and Index indicates the individual object to be returned. It will be appreciated that the Index may be a number (i.e., a "Long") indicating the ordinal position of the requested Type object in the document parts collection or a string (i.e., a "Variant") representing the name of the individual Type object.

The child object under the Types object 204 is Type object 210. The Type object 210 is associated with a document part type (e.g., a specific gallery or collection of document parts) which may be inserted into a document such as, for example, Letter AutoText. The Type object 210 contains the standard properties 206 (discussed above). The Type object 210 also includes a Name property 214 which is a read-only string representing the name of the document part type. If the document part type is a "built-in" type (i.e., a default document part type already included in the document part galleries 26), the property returns the name previously assigned to the document part type (e.g., Cover pages). The Type object 210 also includes an IsBuiltIn property 216 which returns a Boolean value (i.e., True or False) indicating whether the document part type is built-in. The Type object 210 also includes an Index property 218 which returns a number or "Long" representing the position of the Type object 210 in the document parts collection. The Type object 210 also includes a Categories property 220 which returns a Categories collection that contains all the categories and document parts under the specified document part type. For instance, for the Letter AutoText document part type, the Categories collection may include the following categories: Attention Line, Closing, Mailing Instructions, Reference Line, Salutation, Subject Line, and Address Placeholders.

The child object under the Type object 210 is Categories object 222. The Categories object 222 includes a collection of categories for a document part type. The Categories object 222 contains the standard properties 206 (discussed above). The Categories object 210 also includes an Item method 226 which returns an individual object in the collection of document part types. For instance, the Item method 208 may be used to return a Salutation object from the collection of categories for the Letter AutoText document type. The Item method 226 may correspond to the following syntax: expression.Item(Index) where expression is an expression that returns a Categories object and Index indicates the individual object to be returned. It will be appreciated that the Index may be a number (i.e., a "Long") indicating the ordinal position of the requested Category object in the document parts collection or a string (i.e., a "Variant") representing the name of the individual Category object. It will further be appreciated that built-in categories may take up the first indexes in a collection. Thus, if a document part type has X built-in categories, indexes 1-X are used by the built-in document part types. The Categories object 222 also include an Add method 228 which may be utilized to add a new Category object to the collection of categories in the Categories object 222. The Add method 228 may correspond to the following syntax: expression.Add (Name) where expression is an expression that returns a Categories object and Name indicates the user-provided name for the new category to be added to the collection.

The child object under Categories object 222 is Category object 230. The Category object 230 represents a specific category in the Categories object 222. The Category object 230 contains the standard properties 206 (discussed above). The Category object 230 also includes a Name property 234 which is a read-only string representing the name of the specific category. If the category is built-in, the property returns the default name assigned to the category. The Category object 230 also includes an IsBuiltIn property 236 which returns a Boolean value (i.e., True or False) indicating whether the category is built-in. The Category object 230 also includes an Index property 238 which returns a number or "Long" representing the position of the Category object 230 in the document parts collection. The Category object 230 also includes a DocumentParts property 240 which returns a DocumentParts collection that contains all the document parts in the specified category. For instance, for the DocumentParts collection for cover pages may include a basic cover pages, academic cover pages, a cover page with picture, and a cover page abstract. The Category object 230 also includes a Type property 242 which returns the Type object that contains the specified category. For instance, for the Salutation category, the Type property 242 would return the LetterAutoText document part type. The Category object 230 also includes a Delete method 244 which may utilized to delete a category and all of the document parts within the category (in a given template). It will be appreciated that for built-in categories, the method may delete the document parts but not delete the category. The Delete method 244 may correspond to the following syntax: expression.Delete where expression is an expression that returns a Category object for deletion.

The child object under the Category object 230 is DocumentParts object 246. The DocumentParts object 246 includes a collection of document parts. The DocumentParts object 246 contains the standard properties 206 (discussed above). The DocumentParts object 246 also includes an Item method 250 which returns an individual object in the collection of document parts. For instance, the Item method 250 may be used to return an academic cover page object from a collection of cover pages. The Item method 226 may correspond to the following syntax: expression.Item(Index) where expression is an expression that returns a DocumentPart object (representing an individual document part) and Index indicates the individual object to be returned. It will be appreciated that the Index may be a number (i.e., a "Long") indicating the ordinal position of the requested DocumentPart object in the document parts collection or a string (i.e., a "Variant") representing the name of the individual DocumentPart object. The DocumentParts object 246 also includes an Add method 252 which may be utilized to add a new DocumentPart object to the collection of document parts in the DocumentParts object 246, based on a specific text range. The Add method 252 may correspond to the following syntax: expression.Add(Name, Range, Description) where expression is an expression that returns a DocumentParts object, Name indicates the user-provided name for the DocumentPart object to be added, Range may be used to highlight the content in the electronic document to be stored in the DocumentPart object to be added, and Description is a string used to enter a description for the new DocumentPart object. It will be appreciated that the Range and Description parameters may be optional. Furthermore, if a Range is not specified, the currently selected text or other data will be stored in the DocumentPart object.

The child object under DocumentParts object 246 is DocumentPart object 254. The DocumentPart object 254 represents a specific document part in the DocumentParts object 246. The DocumentPart object 254 contains the standard properties 206 (discussed above). The DocumentPart object 254 also includes an Index property 258 which returns a number or "Long" representing the position of the DocumentPart object 254 in the document parts collection. The DocumentPart object 254 also includes an ID property 260 which returns a unique identification for the document part. It will be appreciated that the identification may be generated dynamically each time a document part type is created or changed. The DocumentPart object 254 also includes a Name property 262 which is a read-only string representing the name of the specific document part. The DocumentPart object 254 also includes a Description property 264 which returns string or enables a user to enter a string to set the description of the DocumentPart object 254. The DocumentPart object 254 also includes a Value property 266 which returns or sets the value of the document part represented by the DocumentPart object 254. The DocumentPart object 254 also includes an InsertOptions property 268 which returns or sets special insertion options for inserting the document part in a document. The insertion options may include allowing only content, paragraphs, pages, or sections to be inserted in the document part. The DocumentPart object 254 also includes a Type property 270 which returns the Type object that contains the document part represented by the DocumentPart object 254. The DocumentPart object 254 also includes a Category property 272 which returns the Category object that contains the document part represented by the DocumentPart object 254. The DocumentPart object 254 also includes a Delete method 274 which may be utilized to delete a document part. The Delete method 274 may correspond to the following syntax: expression.Delete where expression is an expression that returns a DocumentPart object for deletion. The DocumentPart object 254 also includes an Insert method 276 which may be utilized to insert a document part in place of a specified range in a document. The Insert method 276 may correspond to the following syntax: expression.Insert(Where) where expression is an expression that returns a DocumentPart object for insertion in a document. The Where parameter represents an optional Range object for indicating the location in the document to insert the document part.

It will be appreciated that if a Range object is not specified, the object may be inserted at the current insertion point in the document. It will also be appreciated that built-in document part types may have a predefined insertion point which supersedes the Where parameter. It should be understood that upon the insertion of a document part using the Insert method 276, an OnDocumentPartInsert event 278 is triggered to notify the word processing application program 10 that a document part has been inserted. The OnDocumentPartInsert event 278 may correspond to the following syntax: object_DocumentPartInsert (documentPart, range) where the documentPart parameter is the object representing the document part that was just inserted and the range parameter is the range of the document part in the document.

Figure 3:
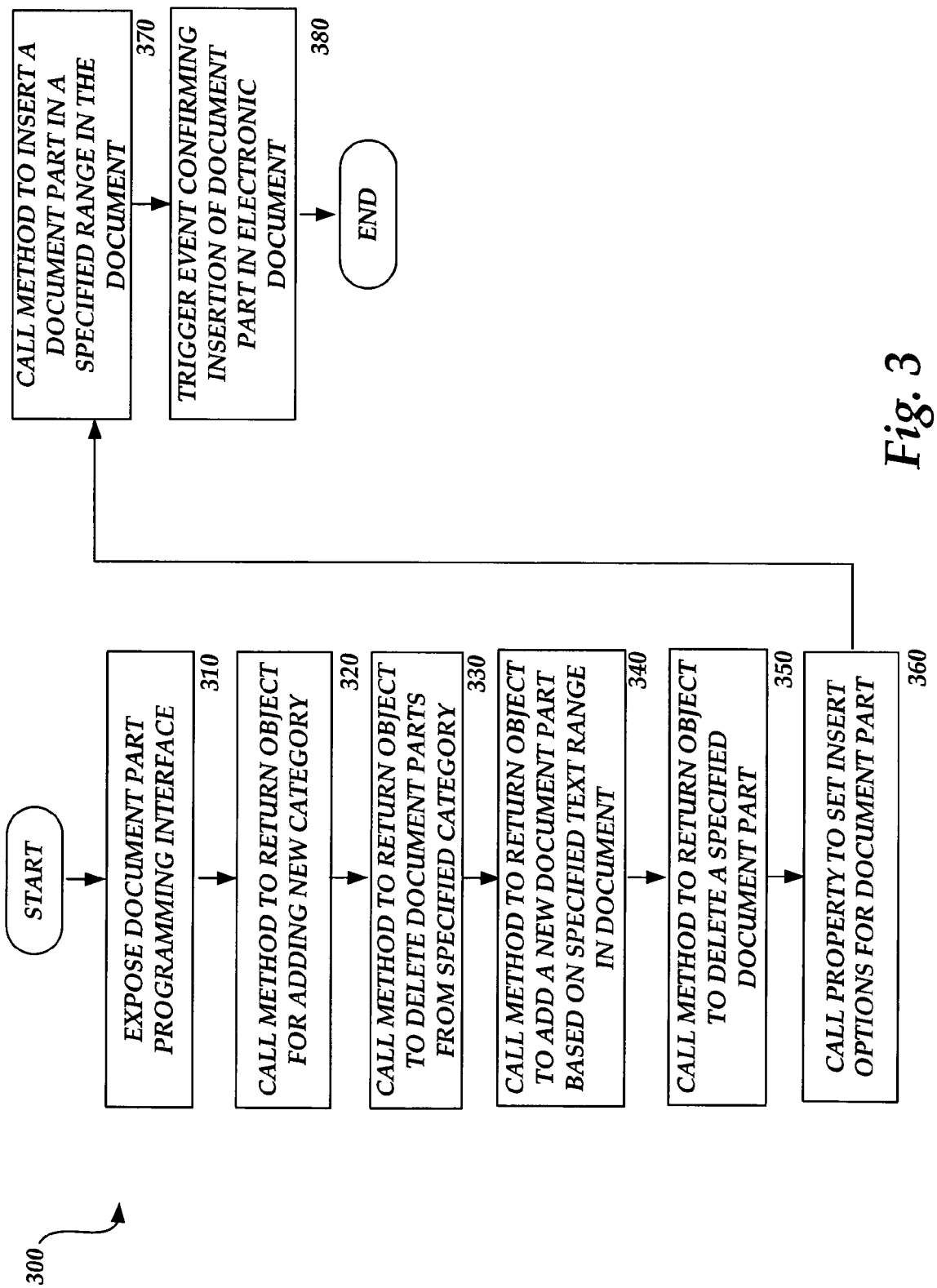
FIG. 3 is an illustrative routine performed by a word processing application program in the computer system of FIG. 1 for utilizing an object model to manage document parts for use in an electronic document, according to an illustrative embodiment of the invention.

Referring now to FIG. 3, an illustrative routine 300 will be described illustrating a process performed by the word processing application program 10 for using an object model to manage document parts for use in an electronic document. It should be appreciated that although the embodiments of the invention described herein are presented in the context of the word processing application program 10, the invention may be utilized in other types of application programs that support text processing.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 3, the routine 300 begins at operation 310, wherein the word processing application program 10 exposes the document part programming interface 11 which allows a user to manage objects corresponding to document parts by calling the properties and methods discussed above with respect to FIG. 2. The routine 300 continues from operation 310 at operation 320 where the programming interface 11 receives, from a user, a call for a method to return an object for adding a new category to a document parts collection such as the document part galleries 26. In particular, the programming interface 11 may receive a call for the Add method 228 to return the Categories object 222 to add a new document part category using the syntax: expression.Add (Name).

The routine 300 then continues from operation 320 at operation 330 where the programming interface 11 receives a call for a method to return an object to delete document parts from specified category. In particular, the programming interface 11 may receive a call for the Delete method 244 to return the Category object 230 to delete all of the document parts for the category represented by the Category object 230 using the syntax: expression.Delete.

The routine 300 then continues from operation 330 at operation 340 where the programming interface 11 receives a call for a method to return an object to add a new document part based on specified text range in the electronic document 24. In particular, the programming interface 11 may receive a call for the Add method 252 to return the DocumentParts object 246 to add a new document part using the syntax: expression.Add(Name, Range, Description).

The routine 300 then continues from operation 340 at operation 350 where the programming interface 11 receives a call for a method to return an object to delete a specified document part. In particular, the programming interface 11 may receive a call for the Delete method 274 to return the DocumentPart object 254 to delete a specified document part using the syntax: expression.Delete.

The routine 300 then continues from operation 350 at operation 360 where the programming interface 11 receives a call for a property to return an object to set insert options for inserting a specified document part. In particular, the programming interface 11 may receive a call for the InsertOptions property 268 to return the DocumentPart object 254 to set insertion options such as content only, paragraphs only, pages only, or sections only, for content to be inserted in a specified document part in the electronic document 24.

The routine 300 then continues from operation 360 at operation 370 where the programming interface 11 receives a call for a method to return an object to insert a document part in a specified range in the electronic document 24. In particular, the programming interface 11 may receive a call for the Insert method 276 to return the DocumentPart object 254 to insert a specified document part using the syntax: expression.Insert(Where).

The routine 300 then continues from operation 370 at operation 380 where the word processing application program 10 receives an event confirming the insertion of a specified document part in the electronic document 24. In particular, after a document part is inserted, the OnDocumentPartInsert event 278 is triggered to notify the word processing application program 10 of the identity of the document part and the range of the document part in the electronic document 24 using the syntax: object_DocumentPartInsert (documentPart, range). The routine 300 then ends.

Based on the foregoing, it should be appreciated that the various embodiments of the invention include a method and apparatus for utilizing a document object model to manage document parts for use in an electronic document. The document object model enables a user to retrieve, insert, add, and delete document parts to and from an electronic document using a programmable interface from within a word processing application program. It will be appreciated that by using the object model disclosed herein has a number of advantages over a user interface for inserting document parts in an electronic document. One advantage is that the object model enables the creation of custom document parts not exposed in the user interface which may be used to create custom documents. Another advantage of the object model is that it enables users to define custom processes which occur after a document part has been inserted into an electronic document. For instance, a user may create a document in which the answers to specific questions trigger the insertion of predefined document parts in the document.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for inserting documents parts into an electronic document, comprising:

exposing a document part interface to a user of an application program configured to create and edit the electronic document;

presenting within the document part interface a document parts collection including a plurality of document parts configured to add structure to the electronic document, wherein the plurality of document parts comprise user created document parts and user modified document parts representing document parts from a combination of other document parts collections, wherein each of the document parts includes one of:

a preformatted structural element; and a layout;

allowing the user to specify a document part to be inserted in the electronic document;

inserting the specified document part to add the structure associated with the specified document part to the electronic document, wherein the specified document part comprises an object in an object model which corresponds to a document part from the document parts collection, wherein the object model is utilized to programmatically automate user repetitive tasks and validate user actions, wherein the object includes a template/document object, wherein the template/document object comprises a template object tree and a document object tree which is independent from the template object tree, wherein each of the template object and document object trees comprises a plurality of hierarchical child objects, the hierarchical child objects comprising a types object and a document part object, wherein the types object is associated with a plurality of document part types including issues, cover pages, headers, footers, and watermarks, wherein the document part object comprises an ID property and a Name property, wherein the ID property returns a unique identification for the document part, wherein the unique identification is generated dynamically each time a document part type is at least one of created and changed, wherein the Name property comprises a read-only string representing the name of the specified document part, wherein the hierarchical child objects are utilized to programmatically manage stored document parts and track and manipulate document parts inserted in the electronic document; and allowing the user to specify a range parameter to highlight content in the electronic document to be stored in a document part object to be added to the document parts collection.

2. The computer-implemented method of claim 1, wherein the application includes a word processing program.

3. The computer-implemented method of claim 1, wherein document programming interface is invoked from within the application.

4. The computer-implemented method of claim 1, wherein each of the preformatted structural elements includes:
- a cover page;
- a mathematical equation;
- an index;
- a table, including one of:
  - a table of contents;
  - a table of figures; and
  - a table of authorities;
- a page header;
- a page footer;
- personal contact information;
- an image;
- a textbox; and
- a watermark.

5. The computer-implemented method of claim 1, further comprising allowing the user to one of:
- add a new document part to the document parts collection; and
- delete an existing document part from the document parts collection.

6. The computer-implemented method of claim 1, further comprising allowing the user to specify a collection of one or more categories in the document parts collection.

7. The computer-implemented method of claim 6, further comprising allowing the user to one of:
- add a new category to the document parts collection; and
- delete an existing category from the document parts collection.

8. The computer-implemented method of claim 1, wherein inserting the specified document part includes inserting the specified document part in place of a specified range in the electronic document.

9. The computer-implemented method of claim 1, wherein inserting the specified document part further comprises triggering an event notifying the application that the document part has been inserted in the electronic document.

10. The computer-implemented method of claim 1, further comprising receiving and responding to a call for setting insertion options for inserting the specified document part in the electronic document.

11. A computer-readable storage medium storing instructions for inserting documents parts into an electronic document to add structure to the electronic document, comprising instructions to:
- allow an application configured to one or more of create and modify the electronic document to call the instructions for inserting the document parts into the electronic document;
- expose a document part interface to a user of an application program configured to create and edit the electronic document;
- present within the document part interface a document parts collection including:
  - one or more categories of document parts; and
  - a plurality of document parts wherein the plurality of document parts comprise user created document parts and user modified document parts representing document parts from a combination of other document parts collections; and
- allow the user to:
  - specify a document part to be inserted in the electronic document to add the structure associated with the specified document part to the electronic document, wherein the specified document part comprises an object in an object model which corresponds to a document part from the document parts collection, wherein the object model is utilized to programmatically automate user repetitive tasks and validate user actions, wherein the object includes a template/document object, wherein the template/document object comprises a template object tree and a document object tree which is independent from the template object tree, wherein each of the template object and document object trees comprises a plurality of hierarchical child objects, the hierarchical child objects comprising a types object and a document part object, wherein the types object is associated with a plurality of document part types including issues, cover pages, headers, footers, and watermarks, wherein the document part object comprises an ID property and a Name property, wherein the ID property returns a unique identification for the document part, wherein the unique identification is generated dynamically each time a document part type is at least one of created and changed, wherein the Name property comprises a read-only string representing the name of the specified document part, wherein the hierarchical child objects are utilized to programmatically manage stored document parts and track and manipulate document parts inserted in the electronic document; and
  - allow the user to specify a range parameter to highlight content in the electronic document to be stored in a document part object to be added to the document parts collection.

12. The computer-readable storage medium of claim 11, wherein the application includes a word processing program.

13. The computer-readable storage medium of claim 11, wherein each of the document parts includes one of:
- a preformatted structural element; and
- a layout.

14. The computer-readable storage medium of claim 13, wherein each of the preformatted structural elements includes:
- a cover page;
- a mathematical equation;
- an index;
- a table:
- a page header;
- a page footer;
- personal contact information;
- an image;
- a textbox; and
- a watermark.

15. The computer-readable storage medium of claim 11, further comprising receiving and responding to an insert options call for setting insertion options for inserting the specified document part in the electronic document.

16. A computer-readable storage medium storing instructions for inserting documents parts into an electronic document, comprising instructions to:
- expose a document part interface to a user of an application program configured to create and edit the electronic document;

present within the document part interface a document parts collection comprising a plurality of document parts, the plurality of document parts comprising user created document parts and user modified document parts representing document parts from a combination of other document parts collections, the document parts collection further including:

a preformatted structural element, including:
  a cover page;
  a mathematical equation;
  an index;
  a table;
  a page header;
  a page footer;
  an image;
  a textbox;
  a watermark; and
  a layout; and
allow the user to specify a document part to be inserted in the electronic document, wherein the specified document part comprises an object in an object model which corresponds to a document part from the document parts collection, wherein the object model is utilized to programmatically automate user repetitive tasks and validate user actions, wherein the object includes a template/document object, wherein the template/document object comprises a template object tree and a document object tree which is independent from the template object tree, wherein each of the template object and document object trees comprises a plurality of hierarchical child objects, the hierarchical child objects comprising a types object and a document part object, wherein the types object is associated with a plurality of document part types including issues, cover pages, headers, footers, and watermarks, wherein the document part object comprises an ID property and a Name property, wherein the ID property returns a unique identification for the document part, wherein the unique identification is generated dynamically each time a document part type is at least one of created and changed, wherein the Name property comprises a read-only string representing the name of the specified document part, wherein the hierarchical child objects are utilized to programmatically manage stored document parts and track and manipulate document parts inserted in the electronic document; and allow the user to specify insertion options for inserting the specified document part, wherein specifying insertion options comprises receiving a call from a property to return an object to set the insertion options, the insertion options comprising pages only to be inserted into the specified document part; and allow the user to specify a range parameter to highlight content in the electronic document to be stored in a document part object to be added to the document parts collection.

17. The computer-readable storage medium of claim 16, wherein the application includes a word processing program.

18. The computer-readable storage medium of claim 16, wherein the document part interface is invoked from within the application.

19. The computer-readable storage medium of claim 16, further comprising instructions to:
  present the document parts in one or more categories of document parts; and
  allow the user to one of:
    add to or delete from the categories of document parts;
    add to or delete from the document parts within the one or more categories.

* * * * *